July 6, 1965     H. M. TOMASKO ETAL     3,192,639
APPARATUS FOR ANGULARLY RELATING MEMBERS ON A SHAFT
Original Filed Jan. 20, 1960     3 Sheets-Sheet 1

INVENTOR
ROBERT A. HILL
HOWARD M. TOMASKO
BY Robert M. Dunning ATTORNEY

INVENTOR
ROBERT A. HILL
HOWARD M. TOMASKO
BY Robert M. Dunning
ATTORNEY

United States Patent Office 3,192,639
Patented July 6, 1965

3,192,639
APPARATUS FOR ANGULARLY RELATING
MEMBERS ON A SHAFT
Howard M. Tomasko and Robert A. Hill, Minneapolis,
Minn., assignors to Waterous Company, St. Paul, Minn.,
a corporation of Minnesota
Original application Jan. 20, 1960, Ser. No. 3,551.
Divided and this application Apr. 18, 1962, Ser. No.
188,311
5 Claims. (Cl. 33—182)

This is a division of our previously filed application Serial No. 3,551, filed January 20, 1960, for Pretimed Three Lobed Rotary Pump.

This invention relates to an improvement in apparatus for angularly relating members on a shaft and deals particularly with an apparatus for mounting a gear in proper predetermined relation to a rotor lobe on a common shaft.

In the production of rotary pumps of the type described, considerable time and effort is required to properly locate the gears on the shafts. Due to the fact that the lobes on the pump interengage with but slight clearance therebetween, it is necessary to position the intermeshing gears on the rotor shafts with extreme accuracy. In the past, it has been usual practice to mount the rotors on suitable fixtures, to key the gear on one of the shafts, and to then key the intermeshing gear to the other shaft through the use of a split key or some other arrangement to compensate for variations in the location of the keyway in the shaft and the location of the keyway in the gear. Properly timing the gears relative to the rotors has usually required from six to twenty hours of manual labor. It is an object of the present invention to provide a pump of the type described having the gears properly related to the rotors before the pump is assembled.

As will be understood, the lobes of one rotor are separated by "valleys" to accommodate the lobe of the cooperating rotor. As long as the gears on both rotor shafts have the same number of gear teeth, the two rotors will operate in unison. We have found, however, that by properly choosing the gears, and by securing each gear to the rotor shaft so that the center of a gear tooth is directly aligned with the center of the rotor lobe, the rotors and their gears may be pretimed. Obviously the same result can be accomplished by centering a gear tooth "space" (midway between the gear teeth) with the center of a gear lobe. To do this two things are necessary. In the first place, it is necessary that the number of teeth on the gears be a multiple of the number of lobes. Secondly, it is necessary that, midway of the angular distance between the lobes, the gear must have a gear tooth space, when the gear teeth are centered with the rotor lobes or a gear tooth when the lobes are centered with a gear tooth space. To simplify this description, the gears will be described as having teeth centered with the rotor lobes, although the opposite could be true.

To better describe the invention, we can consider a three-lobed pump, driven by intermeshing gears. The gears have teeth centered with each rotor lobe, meeting the first requirement mentioned above. To center the lobe of one rotor with the valley of the other rotor, each gear must have a tooth space angularly centered between the teeth aligned with the lobes. In other words, with a three-lobed rotor, the gears must have an odd number of teeth, as gears with an even number of teeth would provide a gear tooth midway between the gear teeth aligned with the lobes.

From this description, we have worked out the formula:

$$N = (M \times 2L) \pm L$$

where N equals the number of gear teeth, M represents an arbitrary multiple or whole number, and L represents the number of lobes. Considering L to constitute an arbitrary multiple such as five, the number of gear teeth N on the gears would be five times six, plus or minus three; or thirty, plus or minus three; equaling thirty-three or twenty-seven teeth. The same formula can be used, regardless of the number of lobes on the pump. Obviously, the value of M must be selected so that the number of gear teeth on the gears is sufficient to cause the gears to properly rotate, and the teeth large enough to withstand the loads imposed by the rotors when pumping.

A feature of the present invention resides in the fact that by locating each of the gears in the same relation to the rotors, the rotor shaft and gear assemblies are interchangeable and replaceable. In the past, if it were necessary to replace a rotor, the lobes of the rotor and the teeth of the gear had to be properly timed to properly engage the remaining rotor. By aligning one of the teeth of the gear with each of the rotor lobes, this difficulty is obviated.

A feature of the present invention resides in a novel method of aligning the gears with the rotors. Considering a three lobed rotor, a jig is provided including a supporting surface on which the rotor is supported with two of the three lobes resting against the surface and with the rotor shaft engaged in generally U-shaped fittings. The center of the third lobe of the rotor is then on a plane through the axis of the rotor perpendicular to the supporting surfaces. The gear is mounted on the rotor shaft in the correct axial location and a tooth space on the bottom of the gear is engaged with a tooth-shaped projection fixed on a part of the jig which is movable vertically but fixed from axial or tangential movement. A tooth on the top of the gear is, at the same time, engaged in a notch in a locating arm, and which is movable parallel to the rotor support and cooperable with an indicating gauge to show if the gear has been properly centered relative to the rotor.

These and other objects and novel features of the present invention will be more clearly and fully set forth in the following specification and claims.

In the drawings forming a part of the specification:

Figure 3:
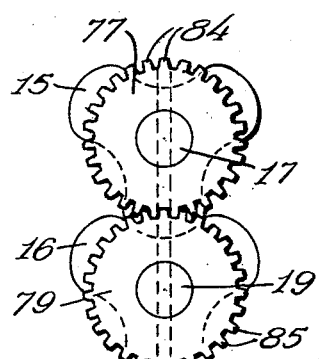

FIGURE 3 diagrammatically illustrates the ends of a pair of rotors and the gears on the rotor shafts, showing the relationship between the lobes and the gears.

Figure 4:
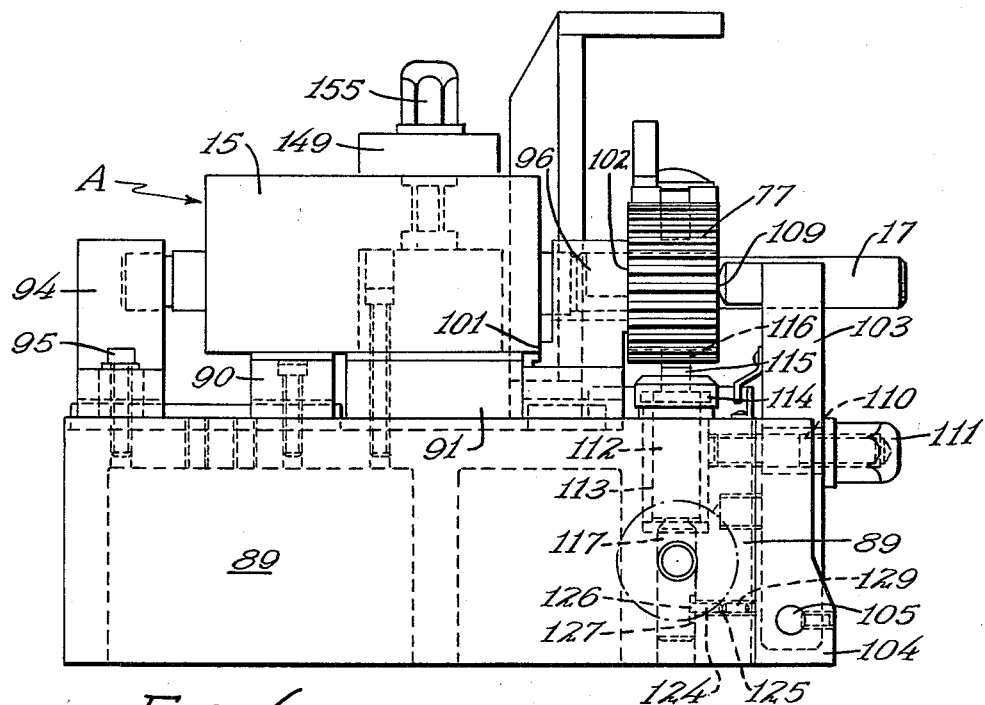

FIGURE 4 is a front elevational view of a jig employed to properly locate the gears relative to the rotors.

Figure 5:
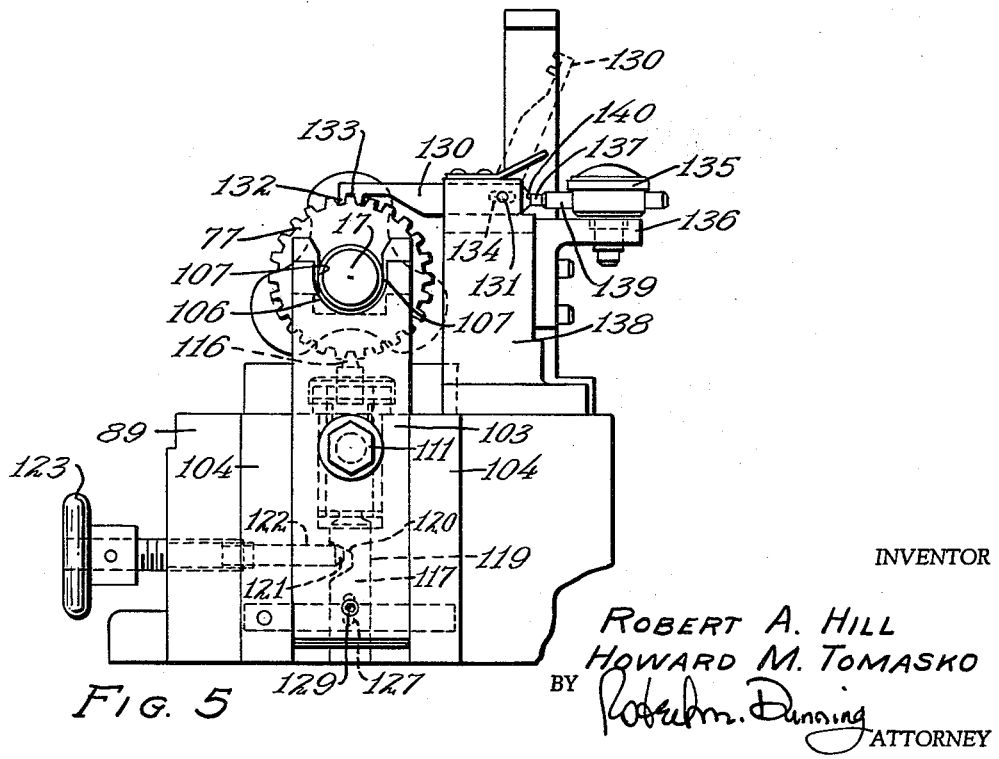

FIGURE 5 is an end elevational view of the jig shown in FIGURE 4.

Figure 6:
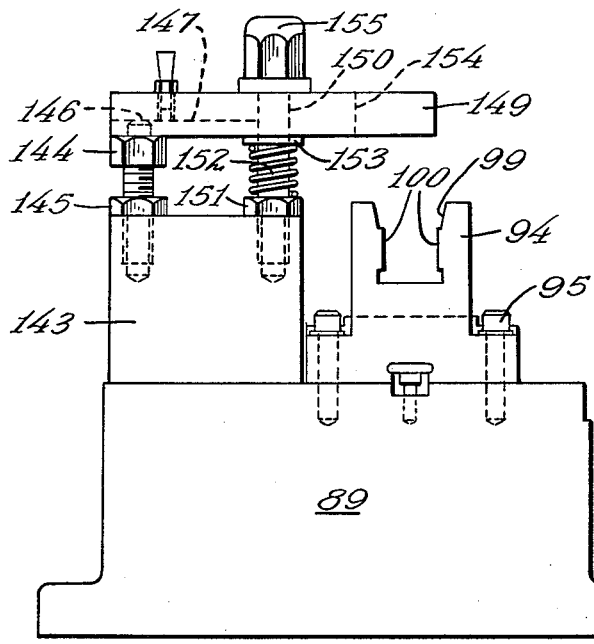

FIGURE 6 is an end elevational view of the jig, the view showing the end of the jig opposite that shown in FIGURE 5.

Figure 7:
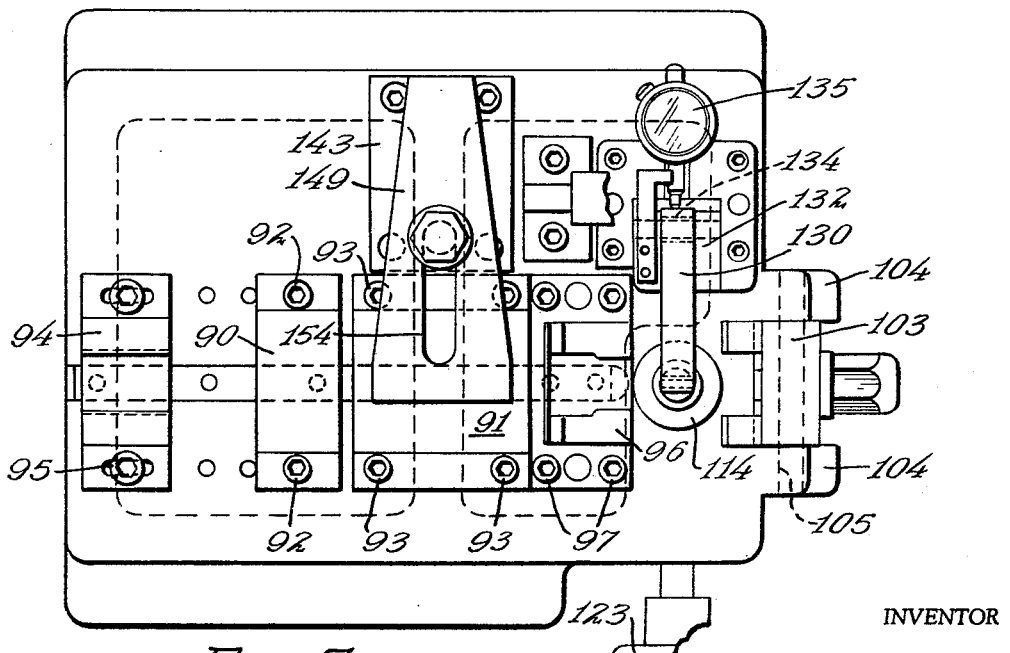

FIGURE 7 is a top plan view of the jig.

The structural features of the pump and the manner of operation thereof are set forth in detail in our previously mentioned application Serial No. 3,555.

However, in order to describe briefly the structural features of the pump structure necessary to an understanding of this invention, the rotary pump is indicated in general by the letter A. The pump includes a housing 10 having upper and lower arcuate portions 11 and 12 which form intersecting rotor chambers 13 and 14 designed to accommodate three-lobed rotors 15 and 16 respectively. The rotors 15 and 16 are mounted upon supporting shafts 17 and 19 respectively. As is usual in pumps of this type, the lobes of the rotors engage in the hollow portions between the lobes of the cooperating rotor to provide a minimum of leakage between the two rotors.

The housing 10 includes an inlet passage 20 and an outlet passage 21 in communication with the rotor chambers 13 and 14. The fluid being pumped enters the inlet 20, is carried between the rotor lobes and the arcuate walls 11 and 12 and are discharged through the discharge passage 21.

The ends of the housing 10 are closed at both ends by end plates 25 which are properly located by dowel pins 26 which extend through the end plates and into the housing 10. Bearing supporting plates 49 are secured in face contact with the end plates 25 and are also located relative to the end plates and the pump housing by suitable means such as by the dowel pins 26. The bearing supporting plates 27 are apertured to accommodate a pair of sealed bearings 28. Seals and grooves 29 are used to seal the outer races of the bearings 28 relative to the walls of the apertures 29. The inner races of the bearings may be sealed relative to the shaft 17.

The bearing supporting plates 27 are also provided with a second pair of aligned apertures 52 which support sealed bearings 54 which support the shaft 19. The outer races of the bearings 54 are sealed relative to the apertures 52 by seals and grooves 56. A relief valve assembly is generally indicated at 57.

Gears 77 and 79 are pinned to the shafts 17 and 19 respectively by pairs of taper pins 80 and 81 extending diametrically to apertures 82 and 83 in axially spaced relation in the gears 77 and 79. The gears 77 and 79 are provided with angularly spaced teeth 84 and 85, the number of which is odd and divisible by three. In the particular arrangement illustrated in FIGURE 3 of the drawings, the gears 77 and 79 have 27 teeth. One of the teeth 84 is directly aligned with the center of each lobe of the rotor 15, and one of the teeth 85 is exactly aligned with the center of each of the lobes of the rotor 16, and a gear tooth space is centered between adjacent lobes. In view of this fact, the rotors are pretimed so that upon insertion of the rotors into the pump so that a lobe of one rotor extends into the valley between the lobes of the other rotor, the teeth of the two gears will be automatically in mesh.

In the past, considerable time and effort have been required to properly time the rotors and gears so that the rotors will fit properly together as the gears rotate. A variation of a few thousandths of an inch in the position of a key or keyway greatly affects the operation of the pump or renders it inoperative. Any small variation in the location of a key or keyway causes a considerably greater variation at the outer diameter of the gear or rotor. As a result, a time of from six to twenty hours has been considered the usual time required to properly time the rotors and gears. In the present method which will be described, the same operation can be completed in perhaps thirty minutes with accuracy virtually guaranteed.

In FIGURES 4 through 7 of the drawings a jig is disclosed which properly locates the gears in pretimed relation to the lobes of the pump rotor. This jig includes a supporting base 89 on which are mounted flat topped surface blocks 90 and 91 having their upper surfaces on a common plane. The blocks 90 and 91 are held in place on the top of the base 89 by any suitable means such as by the bolts 92 and 93. A shaft positioning block 94 is secured on the base 89 by bolts 95 or other suitable means and a generally similar shaft positioning block 96 is supported on the base 89 at the opposite sides of the blocks 90 and 91 and held in place by bolts 97 or other suitable means. As indicated in FIGURE 6 of the drawings, the upper end of each of the shaft positioning blocks 94 and 96 includes a central notch 99 having parallel shaft engaging surfaces 100 on the inner surface thereof. These surfaces 100 are accurately ground or milled to fit portions of the rotor supporting shafts 17 and 19 and the surfaces of the two blocks 94 and 96 are accurately aligned so as to hold the shaft engaged therein from any transverse movement.

The shaft guide block 96 is provided with a projecting ground surface 101 against which the end of a rotor such as 15 may engage. The opposite side of the block 96 is provided with a parallel flat surface 102 which is engageable with a surface of a gear such as the gear 77. When the rotor engages the surface 101 and the gear engages the surface 102, the two elements are properly axially spaced.

A clamping arm 103 is pivotally supported between a pair of ribs 104 on the base 89 by means of a pivot 105. As indicated in FIGURE 5 of the drawings, the clamping arm 103 is provided with a bifurcated end 106 through which the rotor shaft 17 may extend. Opposed ground surfaces 107 properly locate the shaft relative to the clamping arm. As indicated in FIGURE 4 of the drawings, each side of the bifurcated end 106 is provided with a laterally extending rounded projection 109 designed to bear against the gear 77. A clamping bolt 110 having a head 111 extends through the clamping arm 103 and into the base 89 to clamp the rounded projections 109 against the gear.

A means is provided for properly indexing the gears such as 77 relative to the rotor 15. A plunger 112 is slidably supported in a vertical bore 113 having its axis in a vertical plane through the axis of the rotor shaft 17. A head 114 is provided on the upper end of the plunger 113 and an upwardly extending lug 115 having a tapered upper extremity 116 which is shaped similar to the teeth of the gear 77 is mounted on top of the head 114. The plunger 112 is raised and lowered by means of a driving plunger 117 which is slidable in a vertical bore 119 coaxial with the bore 113. The driving plunger 117 is provided with a tapered notch 120 which is designed to receive the frusto-conical end 121 of a threaded shaft 122. The shaft 122 is threaded into the base 89 and is provided with a hand wheel 123 by means of which the threaded pin or shaft 122 may be rotated. A pin 124 is slidably supported in an internally threaded passage 125 which intercepts the axis of the plunger 117 and the pin includes an end 126 which is slidably engaged in a slot 127 extending longitudinally of the plunger 117. The pin 124 is held in place by a set screw 129 and acts to limit the slidable movement of the pushing plunger 117 and also to prevent this plunger from rotation in the bore 119.

An arm 130 is pivotally and slidably connected by a pivot 131 to a bracket 138 mounted on the upper surface of the base 89. The arm 130 is provided with a projection 132 including a notch 133 which is shaped similarly to the shape of the gear teeth. The pivot 131 extends through a slot 134 which is elongated longitudinally of the arm 130 so that the arm 130 may move horizontally within the limits of the slot 134. A gauge 135 is mounted upon a bracket 136 attached to the bracket 138 and includes a plunger 137 which may be moved longitudinally of the sleeve 139. The gauge 135 indicates the position of the plunger 137 which abuts against the end 140 of the arm 130 for a purpose which will be described.

In operation, the rotor 15 which is fixedly mounted upon the shaft 17 is placed upon the ground upper surfaces of the blocks 90 and 91 with two of the three lobes of the rotor resting upon the horizontal upper surfaces of these blocks. The shaft 17 is properly located between the ground surfaces 100 of the shaft positioning block 94 and an intermediate portion of the shaft 17 is properly located between similar ground surfaces of the shaft positioning block 96. The end of the rotor 15 is moved into contact with the locating surface 101. As is indicated in FIGURE 6 of the drawings, a block 143 is mounted upon the base 89 to one side of the blocks which support the rotor 15. A stud 144 is threaded into the top of the block 143 and is held in adjusted relation by means of a lock nut 145. The stud 144 is provided with an axially extending pin 146 which is engageable in a slot 147 in the under surface of a clamping bar 149. The clamping bar 149 extends over the center line of the rotor shaft supports. A threaded stud 150 also extends into the block 143, the axes of the studs 144 and 150 being at right angles to the axis of the rotor shaft. A locking nut 151 holds the stud 150 at a proper elevation. A spring 152 encircles the stud 150 above the nut 151 and supports a washer 153. The stud 150 extends through a slotted aperture 154 in the clamping block 149 and a clamping nut 155 is provided on the end of the stud by means of which the clamping bar 149 may be clamped against the uppermost lobe of the rotor 15, the pin 146 serving as a fulcrum point. The clamping bar 149 will clamp the rotor 15 firmly in place with the center of the uppermost lobe of the rotor on a vertical plane through the axis of the shaft.

The gear 77 is next manually moved against the bearing surface 102 and the plunger 112 is raised by threading the threaded pin or shaft 122 into the notch 120, the frusto-conical end of the shaft acting as a cam against the upper surface of the notch 120. When the wedge-shaped projection 116 on the plunger head 114 is properly engaged in the space between two of the gear teeth 84, one tooth at the top of the gear 77 will be centered on the vertical plane through the rotor shaft 17 and through the center of the uppermost lobe of the rotor.

When the gear is properly located, the arm 130 is pivoted down from the dotted line position illustrated in FIGURE 5 of the drawings to gear engaging poistion shown in full lines in this figure. The arm 130 may move horizontally within the limits of the groove 134, any such lateral movement moving the plunger 137 of the gage 135. If the gear 77 is exactly in the proper location, the gauge 135 will so indicate, the gauge being set to provide a predetermined zero reading when the arm 130 is in proper position. If the gear 77 is not exactly in position, the tooth engaged in the notch 133 will be too near or too far from the plunger 137 and the gauge will so indicate.

Figure 1:
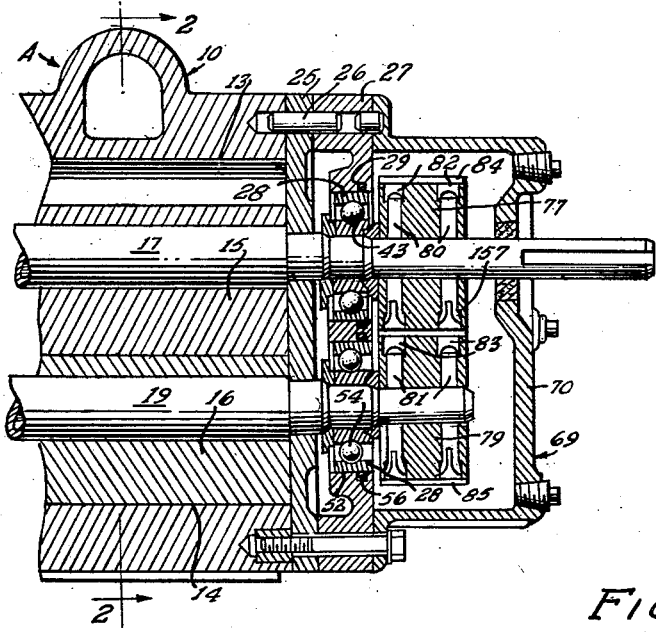
FIGURE 1 is a vertical sectional view of those portions of a rotary pump necessary to an understanding of this invention showing pertinent features of the general form of construction thereof.

The clamping arm 103 may then be tightened against the gear 77 to hold the gear against the surface 102. If preferred, this clamping arm may be tightened prior to the testing of the gear position by the arm 130. Once the clamping bar 149 and the clamping arm 103 are tightened, holes may be drilled in axially spaced relation through the gear 77 and shaft 17, these holes being indicated at 82 in FIGURE 1 of the drawings. The holes 82 are reamed or otherwise cut to a tapered form and undercut at one end as indicated at 157 to accommodate the taper pin 80. This undercutting is done prior to the assembly procedure.

It will be seen that by selecting gears 77 and 79 with spaced peripheral teeth which are in multiples of three, three teeth of each gear will be properly aligned with the center line of the three corresponding rotor lobes. By choosing these gears with an odd number of teeth, a tooth space is provided in alignment with each valley between the rotor lobes. Thus, in assembling the pump, the lobes of the rotors may be readily arranged in properly timed relation through the meshing of the gears 77 and 79. Obviously, the gear 79 is mounted upon the rotor shaft 19 in properly timed relation with the rotor 16 in the manner described, the rotor shafts being identical except for the difference in length. By the use of the fixture, the gears may be pinned to the rotor shaft in a relatively few minutes, effectively accomplishing a result which previously required from six to twenty hours of labor. Furthermore, should it ever become necessary to replace a pump rotor, the new rotor may be inserted in place of the rotor removed and will automatically be in proper time as long as the proper teeth of the meshing gears are engaged.

Figure 2:
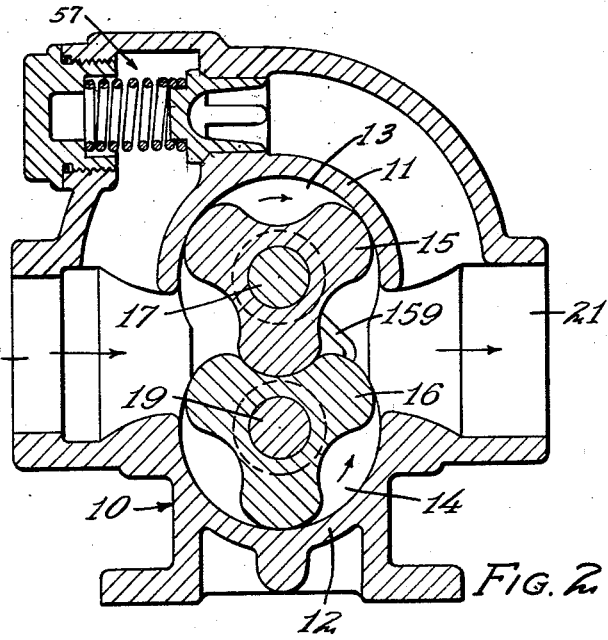
FIGURE 2 is a cross sectional view of the pump shown in FIGURE 1, the position of the section being indicated by the line 2—2 of FIGURE 1.

In FIGURE 2 of the drawings a groove 159 is shown in the end plate 25 forming an end wall of the pump. A similar groove is provided in the other end plate. These grooves lead from the discharge side of the pump to the seal chambers, subjecting these chambers substantially to discharge pressure. If the rotor moves axially until it rubs against the end plate the clearance at that end will be reduced to zero and the pressure in the seal chamber will be substantially equal to discharge pressure. At the other end, however, the clearance between the rotor and the end plate will increase to a maximum, allowing liquid to bleed readily from the seal chamber to the suction side of the pump, reducing the pressure in the seal chamber to somewhat below discharge pressure. This results in an end thrust tending to move the rotor to central position where it has equal clearance with each end plate.

In accordance with the patent statutes, we have described the principles of construction and operation of our improvement in apparatus for angularly relating members on a shaft, and while we have endeavored to set forth the best embodiment thereof, we desire to have it understood that changes may be made within the scope of the following claims without departing from the spirit of our invention.

We claim:

1. An apparatus for properly angularly relating a three lobed pump rotor having a rotor shaft coaxial therewith and fixed thereto with a gear rotatably supported on the shaft, the apparatus including a flat surface on which two of the three rotor lobes are adapted to rest, means positioning the rotor shaft with its axis parallel to said flat surface, means adapted for clamping said rotor against said surface with said two lobes resting thereon, and plunger means supported for movement on an axis normal to said flat surface and including an end for engagement with said gear to hold said gear with the teeth of the gear in fixed angular relation to said rotor lobes.

2. An apparatus for angularly relating one of the rotors of a rotary pump having a pair of identical lobed rotors, shafts coaxial with and supporting said rotors, and gears on said shafts and intermeshing to drive said rotors in unison with the gear mounted on said one rotor, the apparatus including a supporting table on which said one rotor is adapted to rest, the table being adapted for engagement with two of the three angularly spaced rotor lobes to hold said lobes in fixed relation thereto, means adapted for engagement with said shaft above said table adapted for holding said rotor in a predetermined position on said table with the shaft axis parallel to the table, means for clamping said rotor against said table, and means extending perpendicularly relative to said table and in alignment with said means adapted for engagement with said shaft and midway between said two lobes when resting on said table adapted to engage with said gear on said shaft to hold said gear with its teeth in a predetermined angular position relative to said shaft and to the rotor lobes, whereby said gear may be secured to the rotor shaft in fixed relation to the rotor lobes.

3. The structure of claim 2 and in which said means engageable with a gear comprises means capable of engaging between two adjacent teeth on said gear.

4. The structure of claim 2 and including means adapted to engage with said gear when resting on said table and movable in a plane normal to the axis of the rotor shaft, and indicating means actuated by said last named means and providing an indication when the teeth of the gear are properly angularly related to the lobes thereof.

5. The structure of claim 2 and in which said shaft means adapted for engagement with said shaft comprises a pair of bracket members extending upwardly from said table and having aligned notches in the upper ends thereof in which said shaft is adapted to engage.

No references cited.

ISAAC LISANN, *Primary Examiner.*